US011517122B2

(12) United States Patent
Hille

(10) Patent No.: US 11,517,122 B2
(45) Date of Patent: Dec. 6, 2022

(54) FURNITURE DRIVE AND PIECE OF FURNITURE HAVING SUCH A FURNITURE DRIVE

(71) Applicant: DewertOkin GmbH, Kirchlengern (DE)

(72) Inventor: Armin Hille, Bielefeld (DE)

(73) Assignee: DewertOkin Technology Group Co., Ltd, Jiaxing (CN)

(*) Notice: Subject to any disclaimer, the term of this patent is extended or adjusted under 35 U.S.C. 154(b) by 0 days.

(21) Appl. No.: 16/383,281

(22) Filed: Apr. 12, 2019

(65) Prior Publication Data

US 2019/0313808 A1    Oct. 17, 2019

(30) Foreign Application Priority Data

Apr. 13, 2018    (DE) .................. 10 2018 108 870.1

(51) Int. Cl.
| | | |
|---|---|---|
| *A47C 31/00* | (2006.01) | |
| *A47C 20/04* | (2006.01) | |
| *G08C 17/02* | (2006.01) | |
| *G10L 15/22* | (2006.01) | |

(52) U.S. Cl.
CPC .......... *A47C 31/008* (2013.01); *A47C 20/041* (2013.01); *G08C 17/02* (2013.01); *G10L 15/22* (2013.01); *G10L 2015/223* (2013.01); *H04M 2250/02* (2013.01); *H04M 2250/06* (2013.01)

(58) Field of Classification Search
CPC .............. G08C 17/02; H04M 2250/02; H04M 2250/06
USPC ....................................................... 700/275
See application file for complete search history.

(56) References Cited

U.S. PATENT DOCUMENTS

| | | | | |
|---|---|---|---|---|
| 9,719,283 | B2* | 8/2017 | Holzapfel | ............. E05F 1/1253 |
| 2009/0056027 | A1* | 3/2009 | Ball | ........................ A61G 7/05 |
| | | | | 5/690 |
| 2010/0302044 | A1 | 12/2010 | Chacon et al. | |
| 2013/0289770 | A1* | 10/2013 | Rawls-Meehan | ...... A61H 23/02 |
| | | | | 700/275 |
| 2015/0025688 | A1 | 1/2015 | Hille et al. | |
| 2015/0035457 | A1* | 2/2015 | Hille | ..................... A47C 20/08 |
| | | | | 318/16 |

(Continued)

FOREIGN PATENT DOCUMENTS

| | | |
|---|---|---|
| CN | 104271003 | 1/2015 |
| CN | 104380361 | 2/2015 |
| CN | 106249612 | 12/2016 |

(Continued)

OTHER PUBLICATIONS

European Search Report dated May 31, 2019 with respect to counterpart European patent application EP 19 16 8641.

(Continued)

*Primary Examiner* — Md Azad
(74) *Attorney, Agent, or Firm* — Henry M. Feiereisen LLC

(57) ABSTRACT

A furniture drive includes a control device, an electromotive adjustment drive, and a manual control with a manual operator control unit which is connected to the control device via a cable for activating the adjustment drive via a first transmission path for operator control commands. The furniture drive further includes an adapter which is coupled to the control device to establish a second transmission path for operator control commands.

13 Claims, 3 Drawing Sheets

(56) References Cited

U.S. PATENT DOCUMENTS

2015/0130595 A1\*  5/2015  Hille .................. G08C 23/04
                                                    340/12.5
2018/0199716 A1\*  7/2018  Bertinato ............ A47C 31/008

FOREIGN PATENT DOCUMENTS

| DE | 298 16 022    | 12/1998 |
|----|---------------|---------|
| EP | 2036524 A2    | 3/2009  |
| JP | H 06-125942   | 5/1994  |

OTHER PUBLICATIONS

Translation of European Search Report dated May 31, 2019 with respect to counterpart European patent application EP 19 16 8641.

\* cited by examiner

PRIOR ART

FURNITURE DRIVE AND PIECE OF FURNITURE HAVING SUCH A FURNITURE DRIVE

CROSS-REFERENCES TO RELATED APPLICATIONS

This application claims the priority of German Patent Application, Serial No. 10 2018 108 870.1, filed Apr. 13, 2018, pursuant to 35 U.S.C. 119(a)-(d), the disclosure of which is incorporated herein by reference in its entirety as if fully set forth herein.

BACKGROUND OF THE INVENTION

The present invention relates to a furniture drive and to a piece of furniture having such a furniture drive.

The following discussion of related art is provided to assist the reader in understanding the advantages of the invention, and is not to be construed as an admission that this related art is prior art to this invention.

Such furniture drives with manual control by means of a cable-bound manual operator control unit are commercially available in various forms since they can be manufactured in such a way that they can be operated reliably and are cost-effective. In particular, alternatively furniture drives which can be controlled in a wireless fashion by means of a specific manual operator control system or by means of a mobile device, e.g. a smartphone, are also commercially available, and compared with cable-bound manual control this is distinguished by a more conventional and flexible operator control capability. Voice-actuated controls are also known for furniture drives.

It would be desirable and advantageous to obviate other prior art shortcomings.

SUMMARY OF THE INVENTION

According to one aspect of the present invention, a furniture drive includes a control device, an electromotive adjustment drive, a manual control including a manual operator control unit which is connected to the control device via a cable for activating the adjustment drive via a first transmission path for operator control commands, and an adapter coupled to the control device to establish a second transmission path for operator control commands.

The present invention resolves prior art problems by, i.e. providing an adapter, by means of which a second transmission path for operator control commands is made available, and which is coupled to the control device. For example, the adapter can be coupled to the connection for the manual operator control unit on the control device.

The adapter can therefore access the furniture drive in a controlling fashion in such a way that it converts operator control commands, received by the other second transmission path, of a user into corresponding (switching) signals which, for the control device, appear to come from the manual operator control unit. The interface, already present, of the control device to the manual operator control unit is used. Therefore, for the control device, the addition of the operator control demands which are received via the second transmission path takes place in a transparent fashion. By means of the adapter it is therefore easily possible to retrofit a second transmission path for operator control commands and therefore further possible operator control means for already existing furniture drives, without having to modify the existing furniture drive.

According to another advantageous feature of the present invention, the adapter can be arranged electrically between the control device and the manual operator control unit. The plug-type connection which is generally present between the manual control and the control device can then be disconnected by the user with little effort and without tools, in order to connect the adapter intermediately. The plug can advantageously be formed integrally with a housing of the adapter, as a result of which the adapter is connected not only electrically but also mechanically to the control device.

According to another advantageous feature of the present invention, the adapter can include a receiver for waves or signals of the second transmission path. The receiver can be a radio receiver, with the second transmission path including a wireless radio transmission of the operator control commands. In this way, a conveniently usable wireless remote operator control can be retrofitted, for example with a specific remote-control system or a mobile device, e.g. a smartphone which functions as a remote control by means of a corresponding program ("app"). The adapter can be configured for transmission according to the WLAN protocol, Bluetooth protocol or ZigBee protocol. In addition to such standardized protocols, proprietary radio protocols can also be used. Of course, in addition to the receiver, it is also possible to provide a transmitter in the adapter, in order to permit the bidirectional transmission of signals and data. Owing to the protocol, this is generally also necessary when (useful) data is to be transmitted only to the adapter.

According to another advantageous feature of the present invention, the receiver can be or can include a microphone, with the second transmission path including a sound transmission of the operator control commands. In this way, e.g. a voice-actuated control system for the furniture drive can be retrofitted. Advantageously, the adapter has for this purpose a local speech analysis device in order to recognize spoken operator control commands. Alternatively or advantageously additionally, the adapter can be connected to an external speech analysis device in order to recognize spoken operator control commands. The external speech analysis device makes it possible to recognize even complex speech commands without the need to implement the necessary technology in the adapter itself.

According to another advantageous feature of the present invention, the local speech analysis device can act on the control device with a priority that is higher than a priority of the manual control and/or the external speech analysis device. As a result, the local speech analysis device can serve as a safety device for emergency shutdown. For example, it can be provided that the local voice analysis device recognizes instructions such as "stop" and then forwards signals to the control device which lead to an immediate stop (or even a short reversal of the movement direction) of the currently moving adjustment drive, regardless of whether the movement was due to a voice command or the manual control.

According to another advantageous feature of the present invention, the receiver can include an optical sensor, with the second transmission path including an optical transmission of the operator control commands. In this way, the furniture drive can e.g. be extended by an infrared remote control.

According to another advantageous feature of the present invention, the adapter can be configured to evaluate signals of the optical sensor for a gesture control of the furniture drive. In this case, the optical sensor can be e.g. a camera.

According to another aspect of the present invention, a piece of furniture, in particular a bed, includes a furniture drive which includes a control device, an electromotive adjustment drive, a manual control including a manual operator control unit which is connected to the control device via a cable for activating the adjustment drive via a first transmission path for operator control commands, and an adapter coupled to the control device to establish a second transmission path for operator control commands.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
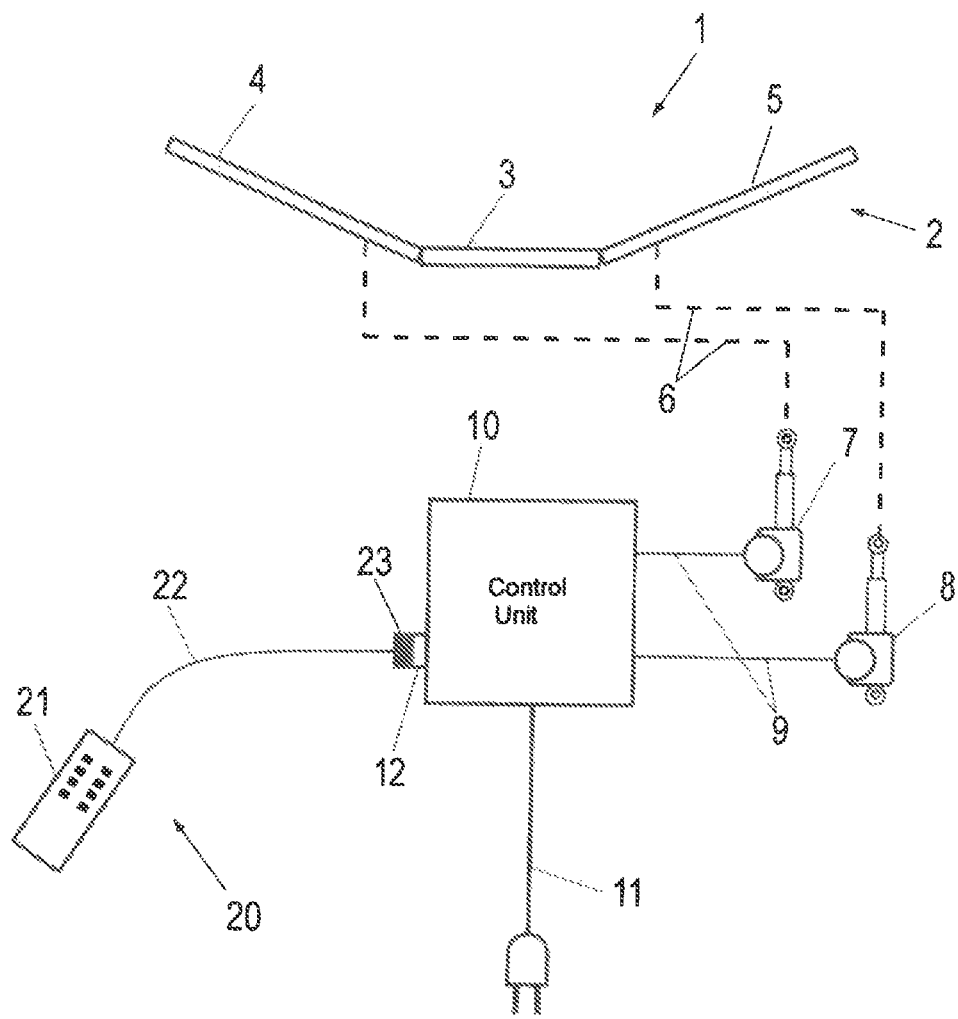
FIG. 1 is a schematic illustration of a bed having a conventional furniture drive.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a bed 1 as an example of a piece of furniture having a conventional electromotive furniture drive The bed 1 has at least one support element 2 for accommodating a mattress (not illustrated here). The bed 1 can be configured as a single bed for one person or else as a double bed for a plurality of persons. The support element 2 is formed from a plurality of panel-shaped parts or from a slatted frame, and is positioned or mounted on a base element (not illustrated here), e.g. a frame with feet.

In the illustrated example, the support element 2 has a back part 4 and a leg part 5 which are arranged so as to be mounted in a movable fashion relative to a fixed middle part 3 or relative to the base element. This movable arrangement is implemented, for example, by means of what is referred to here as a movement fitting. The movement is embodied to be slidable and/or pivotable.

The bed 1 which is shown in this example is equipped with an electromotive furniture drive. The movably mounted back part 4 and the leg part 5 are each coupled here via a mechanical connection 6, shown only schematically, to an electromotive adjustment drive 7, 8. The back part 4 is therefore coupled to the electromotive adjustment drive 7. The electromotive adjustment drive 8 is provided for moving or adjusting the leg part 5.

The electromotive adjustment drives 7, 8 are embodied here as linear drives. The linear drives have one electric motor or a number of electric motors, wherein a rotational speed reduction gear mechanism with at least one gear stage is generally connected downstream of each of the electric motors. A further gear mechanism, for example in the form of a threaded spindle gear mechanism, which generates a linear movement of an output element from the rotational movement of the motor, can be connected downstream of the rotational speed reduction gear mechanism. The last gear mechanism element or a further element connected thereto forms the output element. The output elements of the respective electromotive adjustment drive is connected to the respective furniture component (back part 4, leg part 5) or alternatively to a component which is connected to the base element, with the result that when the electric motor of the respective adjustment drive 7, 8 is operating, the respective furniture components 4, 5 are adjusted relative to one another and/or relative to the base element.

The electromotive adjustment drives 7, 8 are electrically connected, for their activation or actuation, to a control device 10. This connection can be embodied e.g. as a pluggable cable connection 9. The control device 10 has an electrical supply unit which makes available the electrical energy, e.g. from a power supply system, for the electromotive adjustment drives 7, 8. For this purpose, the control device 10 in this example can be connected to a power system plug with a power system connection via a power system cable 11. The power system plug conducts the input-side power system voltage to the electrical supply unit of the control unit 10 via the power system cable 11, which supply unit outputs a low voltage in the form of a direct voltage on the secondary side.

As an alternative to this, an external power-system-dependent voltage supply with a power system input and with a secondary-side low voltage output is connected upstream of the control device 10 and feeds the low voltage in the form of a direct voltage via the line.

In an alternative refinement, the control device 10 is not arranged, or not completely arranged, in a separate housing, but instead entirely or partially integrated into one of the adjustment drives 7, 8. This adjustment drive then constitutes the main drive to which, if appropriate, further adjustment drives can be connected.

In the case of the furniture drive shown in FIG. 1, for the purpose of operating control an element cable-bound manual control 20 with a manual operator control unit 21 is present, which manual operator control unit 21 has operator control units, e.g. in the form of pushbutton keys. Activation of the operator control elements is transmitted via the illustrated cable 22 to the control device 10 which actuates the adjustment drives 7, 8 in accordance with the operated elements. This actuation can be subject to specific limitations, for example specific adjustment drives 7, 8 or specific adjustment ranges can be excluded from an adjustment or can be accessible only after enabling, e.g. via a key switch or a similar superordinate element. In addition, in each case one or more limit switches, which prevent movement beyond one or two defined end points, can be arranged in the adjustment drives 7, 8.

In order to connect the manual operator control unit 21 to the control device 10, a manual operator control connection 12, e.g. in the form of a belt-in socket, is arranged on the control device 10. The free end of the cable 22 is provided with a plug 23 which is plugged into the manual operator control connection 12.

Such furniture drives with manual control 20 by means of a cable-bound manual operator control unit 21 are available commercially in various forms, since they can be manufactured in such a way that they can be operated reliably and are cost-effective. There are variants available here in which a motor current of the adjustment drives 7, 8 is switched directly in the manual operator control unit 21, and variants in which control signals are transmitted from the manual operator control unit 21 via the cable 22, wherein the motor currents are connected by means of switching members (relays or semiconductor switches) in the control unit 10.

Figure 2:
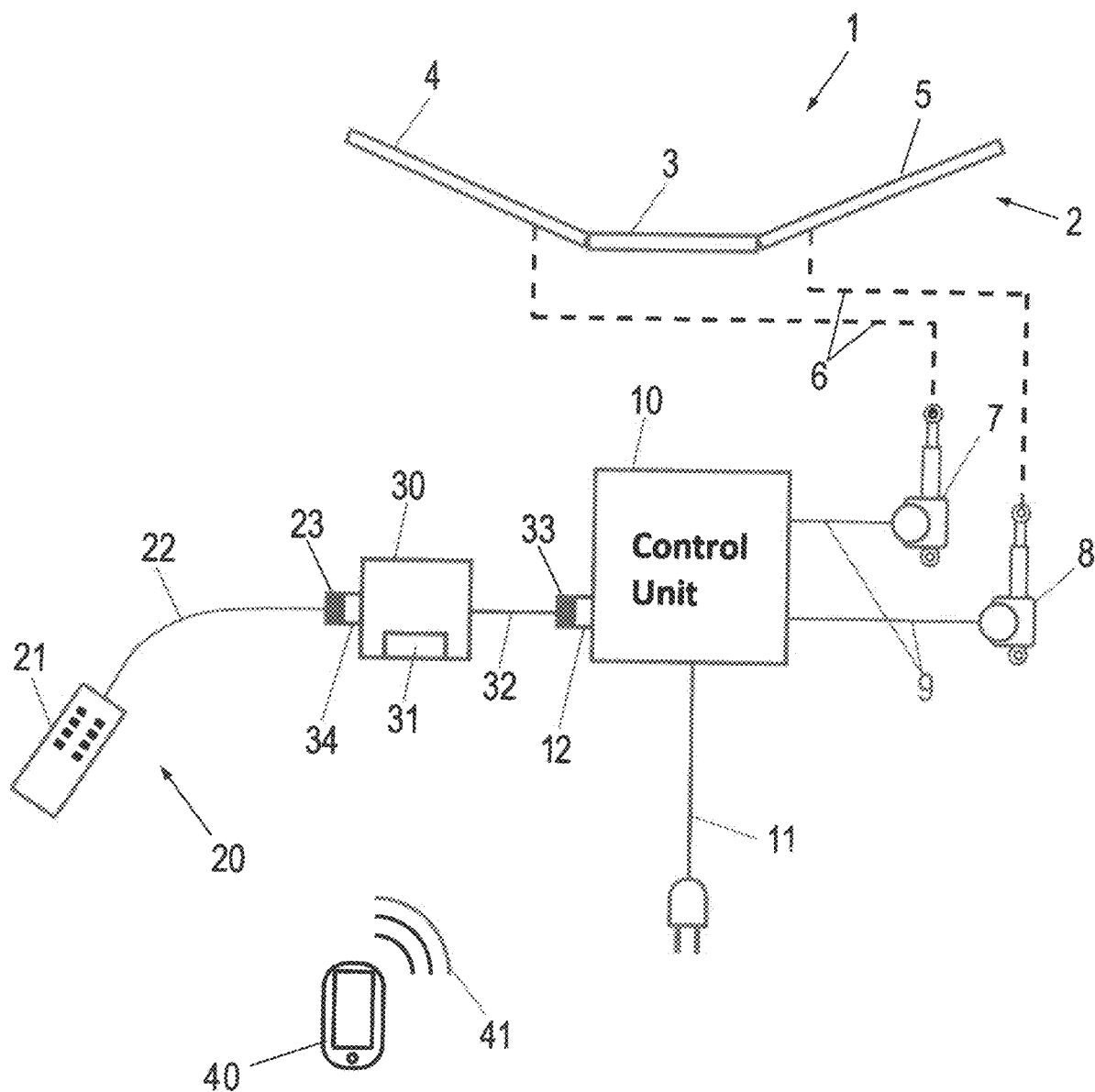
FIG. 2 is a schematic illustration of a bed having a furniture drive according to a first exemplary embodiment of the present invention.

FIG. 2 illustrates a first exemplary embodiment of a furniture drive according to the invention in the same way as in FIG. 1 and using the same bed 1 as an example of a piece of furniture.

The furniture drive according to FIG. 2 is formed by retrofitting the furniture drive according to FIG. 1 with an adapter 30. The design and the function of the adapter 30 are explained in more detail below. All the other components, in particular the control device 10 and the manual control 20 as well as the adjustment drives 7, 8 are the same in the two examples. Reference is made to the corresponding description relating to FIG. 1.

The adapter 30 is looped in between the control device 10 and the manual control 20 and for this purpose has itself a cable 32 and a plug 33 which is compatible with the plug 23 of the manual control 20 and is plugged into the manual operator control connection 12 of the control device 10. Furthermore, the adapter 30 has a manual operator control connection 34 which is embodied to be compatible with the manual operator control connection 12 of the control device 10. The plug 23 of the manual control 20 is plugged into said manual operator control connection 12.

The adapter 30 is configured here so as to feed all the relevant conductors or signals of the cable 22 or contacts of the plug 23 through to the manual operator control connection 12 of the control device 10, with the result that the functionality of the manual control 20 is provided without modification.

Moreover, the adapter 30 has a receiver 31 which is suitable here for receiving radio signals 41 which are emitted by a mobile device 40 in the illustrated example. By means of the receiver 31, the adapter 30 makes available a second transmission path for operator control commands, in addition to a first transmission path which is established via the manual control 20.

Radio signals 41 which are received from the receiver 31 are evaluated within the adapter 30 and implemented in such a way that at the plug 33 electrical signals are output or electrical connections are made available which correspond to the actuation of an operator control element of the manual operator control unit 21, and are therefore detected by the control device 10 as operator control commands, for example for actuating the adjustment drives 7, 8.

A wireless operator control means can be easily added to an already existing furniture drive by means of the adapter 30, without the need for a modification at the control device 10 and without the possibility of performing operator control via the manual control 20 being lost. Intermediate connection of the adapter 30 is transparent for the control device 10 insofar as from the side of the control device 10 it is not possible to detect whether an operator control command originates from the manual control 20 or the control by means of the mobile device 40.

If, in the case of the furniture drive, a direct switching operation of the motor currents of the adjustment drives 7, 8 takes place in the manual operator control unit 21, switching members, which are also able to switch the motor current directly, are correspondingly present in the adapter 30. If switching of the motor currents is provided within the control device 10, corresponding signals—analog, digital and/or by means of a bus protocol—are generated in the adapter 30 and then bring about the switching of the motor currents via the switching members in the control device 10.

The operator control of the furniture drive by means of the manual control 20 or by means of the mobile device 40 can be treated equivalently by the adapter 30 here. However, it is also possible for the adapter 30 to perform prioritization of the signals to the effect that either the manual control 20 or the control by means of the mobile device 40 is treated with priority. It is also conceivable that it is possible to make a setting by means of the mobile device 40 that only specific operator control commands of the manual operator control unit 21 are fed through, while other operator control commands are not fed through. In this way, when the furniture drive is used in a nursing bed or hospital bed, the use of specific adjustment drives 7, 8 by the patient or the person in need of nursing can be prevented.

The mobile device 40 can be, in particular, a commercially available mobile telephone ("smartphone") or a tablet computer. A piece of software ("app") is advantageously installed for the function of the control of the furniture drive on the mobile device 40. Operator control commands to the adjustment drives 7, 8 are then transmitted to the control device 10 by means of the radio signals 41 via a further wireless transmission path from the mobile device 40 which is used as a manual operator control means to the control device 10. The further wireless transmission path can be based, for example, on a standardized WLAN (Wireless Local Area Network) transmission path or Bluetooth transmission path or ZigBee transmission path. It is also alternatively possible to provide proprietary transmission paths or protocols for the radio signals 41. Of course, in addition to the receiver 31 it is also possible to provide a transmitter in the adapter, in order to permit the bidirectional transmission of signals and/or data. This is generally also necessary, owing to of the protocol, if (useful) data are transmitted only from the mobile device 40 to the adapter 30.

Figure 3:
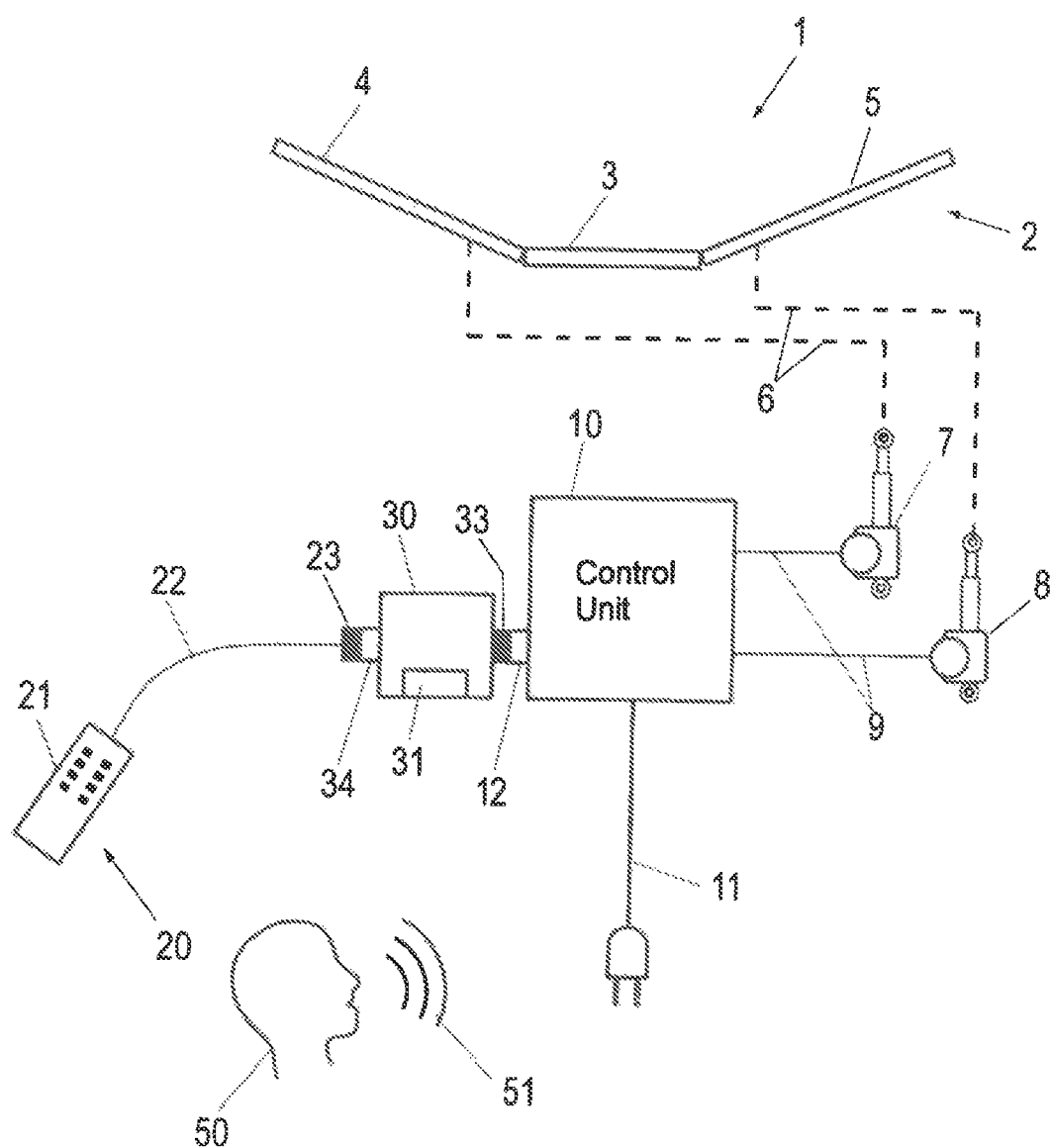
FIG. 3 is a schematic illustration of a bed having a furniture drive according to a second exemplary embodiment of the present invention.

FIG. 3 illustrates a further exemplary embodiment of a furniture drive according to the invention, in turn on the same bed 1 as in the preceding example and based on a comparable furniture drive.

The same reference symbols identify in this exemplary embodiment the same or identically acting elements to those in the preceding examples. With respect to the basic design of the furniture drive, reference is made to the description of the preceding examples.

A difference from the exemplary embodiment in FIG. 2 is the connection between the adapter 30 and the control device 10. In the example in FIG. 3, the plug 33 with which the adapter 30 is plugged into the manual operator control connection 12 of the control device 10 is not connected to the adapter 30 via a cable but instead is embodied integrally on the housing thereof. In this way, the adapter 30 does not require any separate mechanical fastening but instead is coupled electrically and mechanically to the control device 10 via the plug 33.

Moreover, in contrast with the exemplary embodiment in FIG. 2, a microphone is provided as a receiver 31 in the case of the adapter 30 in FIG. 3, which microphone is used to implement voice-activated control for the furniture drive. Spoken operator control commands of a user 50 are transmitted as sound waves 51 to the adapter 30, received there by the microphone and converted into electrical signals. These are evaluated in a speech analysis device and converted into control signals for the control device and/or used directly to switch the motor currents by means of switching members.

In order to evaluate the electrical signals of the microphone, the adapter 30 has, for example, a microcontroller, a digital signal processor (DSP) as well as digital and/or analog filters which are part of a local speech analysis device. It is therefore possible, for example, to detect spoken operator control commands such as "lower legs" or "raise head" and to convert them into a movement of the corresponding adjustment drive.

It can additionally be provided that safety-relevant speech information which brings about an emergency deactivation of the adjustment drives 7, 8 is detected. This emergency deactivation function can also come into play if an operator control command for activating one of the adjustment drives is output via the manual control 20.

For example, there can be provision that the local speech analysis device detects instructions such as "stop" and then conducts signals to the control device 10 which bring about immediate stopping (or even a brief reversal of the directional movement) of the currently moved adjustment drive, irrespective of whether the movement has taken place on the basis of a speed command or the manual control 20.

In an alternative refinement of the adapter 30, there can be provision that evaluation of the electrical signals of the microphone takes place partially in the adapter 30 itself and, if appropriate, additionally in an external speech analysis device, which is available e.g. as what is referred to as a cloud service.

In order to be able to use an external speech analysis device, the adapter 30 is then connected to a network in a wire-bound fashion, e.g. via an Ethernet cable, or else in a wireless fashion, which permits access to the Internet.

The analysis of the signals which are output by the microphone is then divided into two branches, one of which comprises the local speech analysis device and the other the external speech analysis device.

During the operation of the adapter 30, electrical signals of the microphone are transmitted in digitized form to the external speech analysis device. The external speech analysis device analyses the data and extracts a speech content. A detected speech content is also transmitted back in digital form, e.g. in the form of text. The text is then evaluated in the adapter 30 and operator control commands which are found are implemented. Through the high-power external speech analysis, an even more convenient possible way of controlling the adjustment drives 7, 8 and, if appropriate, components which are connected to the control device 10 is made possible.

The convenient speech control is to be understood here as meaning that the speech control reacts in a flexible way to spoken words and can, if appropriate, be trained and/or expanded with respect to the usable vocabulary. This object requires a high computing power and a complex speech analysis system. The adapter 30 advantageously uses for this purpose existing external speech analysis devices, with which contact can be made via the Internet. Such services are made available by various Internet providers as so-called cloud services. In this context, a standardized network interface technology in the form of an API (Application Programming Interface) or a standardized network enquiry, e.g. via the REST protocol, can generally be used.

Typical spoken commands can be in the form of "move backrest" or "lower leg support" or "assume reading position" or the like. Other commands in the form "store this position under the name . . . " are conceivable when using a local speech analysis system. Furthermore, commands which are factory set such as "move in to the TV position" or "move to zero gravity" or "move into the lying position" can also be provided, which commands are linked to permanently preset adjustment positions for the head part and/or the foot part. The abovementioned commands are purely of an exemplary nature here and can be adapted as desired to the functional possibilities of the bed 1 or of the piece of furniture with the furniture drive.

If appropriate, provision is made to firstly use a preceding key word which is detected by the local speech analysis device in the adapter 30 and activates transfer of the recorded speech to the external speech analysis device, with the result that recorded signals are transmitted via the Internet only when they also relate to the furniture drive.

Even in the case of such a combination of local and external speech analysis there can be provision made that the local speech analysis device which is always available serves, in particular, for evaluating safety-relevant speech information.

The speech control is convenient by means of the external speech analysis, but it is nevertheless safe since the commands which are based on the external evaluation can be overwritten at any time by the emergency deactivation by means of the local speech analysis device.

The local speech analysis device can make use here of a microcontroller, of a DSP (Digital Signal Processor) and/or of an FPGA (Field Programmable Gate Array), wherein the specified components are, if appropriate, integrated in the form of an SOC (System On Chip). In this way, at least one analysis of speech inputs can occur in a way which is limited to a small number of keywords with relatively low expenditure on hardware. The specified keyword "stop", for example, can easily and safely be identified on the basis of the characteristic phonetics. In addition to explicit words, it is also possible to detect sounds which might be used in conjunction with dangerous situations and are interpreted as a sign to the adjustment drives 7, 8 to make them stop or make them run in reverse. A further increased safety level is therefore achieved.

In particular, if only a few keywords have to be detected in the local speech analysis device, it is also advantageously possible to use a microphone into which the local speech analysis device is integrated. The expenditure on components for the adapter 30 can therefore be minimized.

In a further alternative refinement of the exemplary embodiment in FIG. 3, it is possible to provide evaluation not of language but instead of other sound events, e.g. of individual rattling events or of various rattling sequences which differ in their rhythm.

In further alternative embodiments, there may be an optical receiver 31 present in the adapter 30, with the result that a second transmission path which is also based on optical signals is made available. It is therefore easily possible to retrofit e.g. a remote-control system operating with infrared light to control the furniture drive.

It is also possible to retrofit a gesture control system by means of the adapter 30. In this case, the adapter 30 has one or more optical sensors, e.g. cameras, with which the movement of a body part can be detected with respect to speed and direction. Operator control commands for the furniture drive are derived from the sensed gestures.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A furniture drive, comprising:
   a control device including a connection;
   an electromotive adjustment drive;
   a manual control including a cable provided with a plug and a manual operator control unit which is connected to the control device connection via the manual control cable and plug for activating the adjustment drive via a first transmission path for operator control commands; and
   an adapter looped in between the control device and the manual control to establish a second transmission path for operator control commands, said adapter including a cable provided with a plug for connection to the control device connection and a manual control connection for connection to the manual control plug, wherein the adapter manual control connection is embodied to be compatible with the manual control plug and the adapter plug is embodied to be compatible with the control device connection.

2. The furniture drive of claim 1, wherein the adapter includes a receiver for waves or signals of the second transmission path.

3. The furniture drive of claim 2, wherein the receiver is a radio receiver, said second transmission path including a wireless radio transmission of the operator control commands.

4. The furniture drive of claim 1, wherein the adapter is configured for transmission according to a WLAN protocol, Bluetooth protocol or ZigBee protocol.

5. The furniture drive of claim 2, wherein the receiver is or includes a microphone, said second transmission path including a sound transmission of the operator control commands.

6. The furniture drive of claim 1, wherein the adapter includes a local speech analysis device in order to recognize spoken operator control commands.

7. The furniture drive of claim 1, wherein the adapter s connectable to an external speech analysis device in order to recognize spoken operator control commands.

8. The furniture drive of claim 6, wherein the local speech analysis device acts with a priority which is higher than a priority of the manual control.

9. The furniture drive of claim 6, wherein the adapter is connectable to an external speech analysis device in order to recognize spoken operator control commands, said local speech analysis device acting with a priority which is higher than a priority of the external speech analysis device.

10. The furniture drive of claim 2, wherein the receiver includes an optical sensor, said second transmission path including an optical transmission of the operator control commands.

11. The furniture drive of claim 10, wherein the adapter is configured to evaluate signals of the optical sensor for a gesture control of the furniture drive.

12. The furniture drive of claim 1, wherein the adapter includes a housing, said plug being formed integrally with the housing of the adapter.

13. A piece of furniture, in particular a bed, said piece of furniture comprising:
    a furniture drive which includes a control device, said control device including a connection;
    an electromotive adjustment drive;
    a manual control including a cable provided with a plug and a manual operator control unit which is connected to the control device connection via the manual control cable and plug for activating the adjustment drive via a first transmission path for operator control commands; and an adapter looped in between the control device and the manual control to establish a second transmission path for operator control commands, said adapter including a cable provided with a plug for connection to the control device connection and a manual control connection for connection to the manual control plug, wherein the adapter manual control connection is embodied to be compatible with the manual control plug and the adapter plug is embodied to be compatible with the control device connection.

* * * * *